United States Patent

[11] 3,627,792

[72] Inventor Robert W. Eltonhead
 Reading, Pa.
[21] Appl. No. 452,868
[22] Filed May 3, 1965
[45] Patented Dec. 14, 1971
[73] Assignee Crompton & Knowles Corporation
 Worcester, Mass.

[54] PINK DYE FOR NYLON
 6 Claims, No Drawings
[52] U.S. Cl...................................................... 260/373,
  8/39, 8/40
[51] Int. Cl...................................................... C09b 1/54
[50] Field of Search............................................ 260/373

[56] References Cited
 UNITED STATES PATENTS
 1,038,589 9/1912 Jacobi.......................... 260/373
 2,072,259 3/1937 Haddock et al................ 260/373
 3,174,983 5/1965 Ramanathan ................. 260/380

Primary Examiner—James A. Patten
Assistant Examiner—E. Jane Skelly
Attorney—Synnestvedt & Lechner ABSTRACT: A compound of the formula

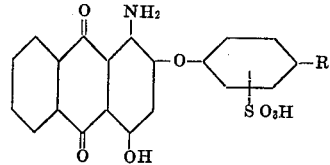

wherein R is H or and alkyl group of 4 to 9 carbon atoms, and the water-soluble sulfonic acid salts thereof.

PINK DYE FOR NYLON

The dyes of this invention have the structure:

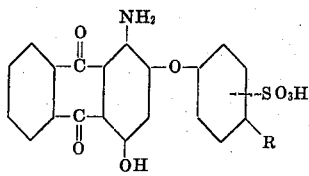

(Structure I)

wherein R is an alkyl group having five to nine carbons. In addition to the free acid, it will be understood that the compounds of this invention also include the water-soluble salts thereof.

The dyes of this invention are obtained by sulfonating known 1-amino-2-alkyphenoxy-4-hydroxy anthraquinones having $C_5$ to $C_9$ alkyl substituents in the phenoxy ring that provide the desired R substitution under conditions that will introduce a single sulfonic group in the dye molecule.

The unsulfonated anthraquinone precursors of the dyes of this invention have been reported as being useful as dispersed dyes for synthetic fibers. When applied as dispersed dyes they impart red shades to acetate, triacetate, modacrylic, polyester and nylon fibers and they merely stain without dyeing cotton, acrylic, silk and wool fibers.

The dyes of this invention have different, unique and unexpected properties as compared to their unsulfonated precursors. They are neutral dyeing acid dyes for natural and synthetic polyamide fibers such as silk, wool and nylon. They do not dye and exhibit good reserving properties with respect to acetate, triacetate, acrylic, modacrylic and polyester fibers.

The dyes of this invention impart to the polyamide fibers bright bluish red shades having a high degree of lightfastness. Further, and in contrast to their unsulfonated anthraquinone precursors, the dyes of this invention will produce superior washfastness for a given depth of shade and their sublimation fastness is also superior. After treatments with conventional fixatives or fastening agents such as tannic acid-tartar emetic, so-called "back tanning" agents or "syntans," etc. greatly enhance the washfastness of dyeings produced using the dyes of this invention, whereas such after treatments have little or no effect on the washfastness of dyeings made with the unsulfonated precursor applied as a dispersed dye.

When the R substituent of the dyes of this invention is an alkyl radical having from five to nine carbons, nylon may be dyed from neutral solution with a very high degree of exhaustion. However, if the R group contains less than five carbons, the neutral dyeing capabilities are significantly lowered. Further if the R group contains more than nine carbons, and as the number of carbons in the R group increases over nine, the neutral dyeing capabilities again become increasingly impaired.

The sulfonation of the anthraquinone precursor is carried out in a conventional manner under a variety of acid strength, times and temperatures so as to introduce a sulfonic group into the dye molecule. The exact positioning of the sulfonic group of the phenoxy ring is not known and it could be in either of the ortho or meta positions or it could even consist of a mixture of the ortho and meta substituted sulfonics. In any event, the anthraquinone precursor and the oleum are reacted in quantities that only an average of one sulfonic group is introduced in the dye. The completion of sulfonation may be determined by testing the solubility of a drop of the sulfonation reaction mass in hot water. When sulfonation is complete, no insoluble starting material will be observed.

The following examples will serve to illustrate the production of the dyes of this invention, illustrate their unique dyeing capabilities, and the utilization of the new dyes.

EXAMPLE 1

144 grams of octyl phenol, 11.8 grams of potassium carbonate, calcined and 20.4 grams of 1 amino 2 bromo 4 hydroxy anthraquinone were heated with stirring to 150° C. and held at 150° C. for 5 hours. After cooling, methanol was added and the slurry (500 ml. vol.) was filtered. The filter cake was washed with methanol, then water, then dried. Obtained 18.8 grams of 1 amino 2 octylphenoxy 4 hydroxy anthraquinone. 10 grams of this was sulfonated by adding it over 30 minutes with stirring to 79 ml. of 25-percent oleum while holding the temperature under 20° C. by means of a cooling bath. After stirring for 4 hours at room temperature, the sulfonation mass was drowned in ice and water, then filtered. The filter cake was slurried in water, neutralized with caustic soda, filtered and dried. Obtained a dye of structure I in which R is

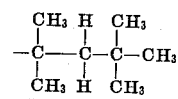

EXAMPLE 2

140 grams of para tert.amylphenol, 11.8 grams of potassium carbonate, calcined and 25.4 grams of 1 amino 2 bromo 4 hydroxy anthraquinone were heated with stirring to 150° C. and held at that temperature for 5 hours. After cooling methanol was added and the slurry was filtered, the filter cake being washed with methanol then water. After drying 25.8 grams of 1 amino 2 amylphenoxy 4-hydroxy anthraquinone were obtained. 10 grams of this was sulfonated with 150 grams of 25 percent oleum for 3 hours at 12° to 20° C. After drowning in ice and water (volume 500 ml. at 12° C.) it was filtered. The filter cake was added to water and made alkaline to a pH of 9.5 with caustic soda, heated to a boil and filtered. 100 grams of salt was added to the filtrate and the precipitated product was filtered off and dried. Obtained a dye of structure I in which R is

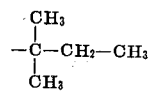

EXAMPLE 3

1 amino 2 bromo 4 hydroxy anthraquinone 36.4 grams, 85 percent phenol 140 grams and potassium carbonate 20.5 grams were heated to and held at 120° C. the water distilling off. After 18 hours at 120° C. the reaction was cooled and diluted with water (vol. at 800 ml.). It was then filtered and the filter cake washed with water till the filtrate was colorless. The filter cake of 1 amino 2 hydroxy anthraquinone when dry weighed 32.8 grams. 10 grams of this was sulfonated by adding it with stirring to 150 grams of 25 percent oleum while the temperature was held at 21°–24° C. by means of a cooling bath. After stirring for an hour at 24°–28° C. it was drowned in ice and water. The 400 ml. volume at 28° C. was filtered. The filter cake was dissolved in water and caustic soda added to a pH of 11.0. It was heated to 60° C. and filtered. 100 grams of salt was added to the 1,000 ml. of filtrate, the pH adjusted to 7.4 with hydrochloric acid and the precipitate filtered off and dried. Obtained a compound of structure I in which R is —H.

EXAMPLE 4

130 grams of para tert. butyl phenol, 11.8 grams of anhydrous potassium carbonate and 25 grams of 1 amino 2 bromo 4 hydroxy anthraquinone were heated with stirring to 150° C. and held at that temperature for 6 hours. After cooling, 300 ml. of methanol were added and the slurry was filtered. After washing with methanol followed by water the filter cake was dried. Obtained 23.5 grams of 1 amino 2 para tert. butylphenoxy 4 hydroxy anthraquinone. 10 grams of this was sulfonated by adding it to 150 grams of 25 percent oleum over 10 minutes while holding the temperature at 17°–19° C. by means of a cooling bath. After stirring the sulfonation for 3 hours at room temperature it was drowned in ice and water and the resulting 400 ml. volume was filtered. The filter cake was slurried in water containing 10 percent salt, neutralized with caustic soda, filtered and dried. Obtained a compound of structure I in which R is

EXAMPLE 5

110 grams of nonyl phenol, 11.8 grams of potassium carbonate, calcined and 25.4 grams of 1 amino 2 bromo 4 hydroxy anthraquinone were heated at 150° C. for 5 hours. After cooling, 160 ml. of methanol were added followed by 40 ml. of water. The slurry was filtered and the filter cake washed with 80 percent methanol, then water. Yield on drying 26.8 grams of 1 amino 2 nonylphenoxy 4 hydroxy anthraquinone. The sulfonation of 10 grams was then carried out in the same manner as described in example 2 to provide a dye of structure I in which R is a branched-chain $C_9$ alkyl group.

EXAMPLE 6

0.5 gram of dyestuff from example 2 (sulfonated 1 amino 2-p-amylphenoxy 4 hydroxy anthraquinone sodium salt) was dissolved in boiling soft water following which the volume for the dye solution was adjusted to 500 ml. with additional soft water. 5 ml. of this solution was then placed in each of four 400 ml. dye beakers and the solution in each beaker was made up to 250 ml. with soft water. The dyebath solutions had a pH of 8.4 at 22° C. At room temperature, a 5-gram piece of multifiber made up of strips of acetate, acrylic (Acrilan) triacetate (Arnel) cotton, acrylic (Creslan 61), polyester (Dacron 54), polyester (Dacron 66) acrylic (Orlon 42) silk, modacrylic (Verel A), viscose and wool, was introduced into one of the dyebath solutions and a 5-gram piece of Nylon 66 tricot dull was introduced into each of the other three dyebath solutions. The temperature of the dyebath solutions was then raised to 200°–210° F. Throughout the course of the dyeing a stirring rod in each of the dye beakers was used to keep the fabric in motion. After one-half hour at 200°–210° F, 5 ml. of 10 percent monosodium phosphate solution was added to one of the dye beakers containing the nylon tricot, resulting in a dyebath pH of about 6. Five ml. of 10 percent acetic acid solution was added to another of the dye beakers containing the nylon tricot, resulting in a dyebath pH of about 3.5. After a further one-half hour at 200°–**° F. the multifiber and the three nylon pieces were removed, rinsed in water and dried.

The nylon, silk and wool bands on the multifiber were dyed red, whereas the polyester was only slightly stained. The nylon tricot pieces were all dyed about the same depth of shade. The baths to which monosodium phosphate and acetic acid dye had been added showed complete exhaustion of color. In the neutral dyebath only a trace of color remained. When the dyeings were made in the above manner using the dyestuff (sulfonated 1-amino-2-octylphenoxy-4-hydroxy anthraquinone obtained from example 1 the color of the dye liquor remaining in the neutral dyebath after the dyeing was even less than that obtained with the dyestuff from example 2 (sulfonated 1-amino-2-amylphenoxy-4-hydroxy anthraquinone). On the other hand, when dyeings were made in the above manner using dyestuffs which had been prepared from phenol (example 3) or alkylphenols where the alkyl group was less than five carbons (example 4), the dye liquor remaining after the neutral dyeing had been carried out was strongly colored and contained an almost equal or even greater amount of dyestuff than that which was on the neutral dyeing of the nylon tricot itself. This was determined by adding 5 ml. of 10 percent acetic acid solution to the remaining neutral dye liquor from which the original nylon dyeing had been removed, introducing a fresh piece of nylon tricot and continuing the dyeing until the dyebath was exhausted. After rinsing and drying the depth of shade of the dyeing was then compared with the depth of shade of the neutral dyeing.

EXAMPLE 7

0.2 gram of dyestuff from example 2 was added to 1,200 ml. of soft water which was heated to a boil to effect solution. The dye solution was cooled to 160° F. and four 5-gram pieces of Nylon 66 tricot dull were introduced. While the fabric was stirred in the dyebath, the temperature of the dyebath was raised to 200°–210° F. and held for 1 hour, following which the fabric pieces were rinsed and dried. The nylon was dyed a bright bluish red.

EXAMPLE 8

0.2 gram of unsulfonated dyestuff (1-amino-2 para tert. amylphenoxy-4-hydroxy anthraquinone) used in preparing the dye in example 2 is dissolved in 20 ml. of acetone. The solution was added to a solution of 2 grams of Lignin sulfonate dissolved in 1,200 ml. of soft water contained in a dye beaker and the acetone removed by boiling. Four 5-gram pieces of nylon tricot were introduced. While the fabric was stirred in the dyebath, the temperature was held at 200°–210° F. for 1 hour following which the fabric pieces were rinsed and dried. The nylon was dyed a dull bluish red.

EXAMPLE 9

Two of each of the following solutions were prepared.
Solution A
 0.2 gram of Cenekol (Althouse) in 300 ml. of soft water.
Solution B
 0.3 gram of Erional N.W. (Geigy) in 300 ml. of soft water.
Solution C.
 0.1 gram Tannic Acid, 0.1 gram acetic acid,
 0.1 gram of Tartar Emetic in 300 ml. of soft water.

A piece of dyed fabric from example 7 was introduced into one set of each solution and a piece of dyed fabric from example 8 was introduced into the other set of solutions. The two sets of A, B, C solutions each containing a 5-gram piece of dyed nylon fabric were heated to 180° F. and held there for about 20 minutes, following which they were rinsed and dried. A number III wash test (AATCC Standard Test Method 36–1961) was run on the two sets of fabric from A, B, C, along with the untreated pieces. All aftertreated fabrics prepared from the fabric of example 7 samples showed an improvement in washfastness over the dyed fabric from example 7. The washfastness of the fabric from example 7 and the samples of fabric from example 7 that were aftertreated as set forth in this example were superior to that of dyeings made according to example 8 even when such fabrics were aftertreated as in this example. The washfastness of fabric of example 8 was poor, and aftertreatment according to this example produced no improvement.

I claim:

1. A composition having the structure

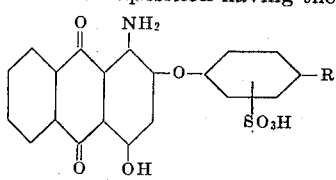

wherein M is —H or —Na and R is —H or an alkyl group of 4 to 9 carbons.

2. A composition having the following structure
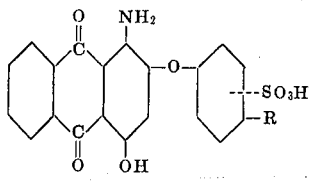
wherein R is an alkyl group of 5 to 9 carbons.
3. The water soluble sulfonic acid salts of a composition according to claim 1.
4. The compound
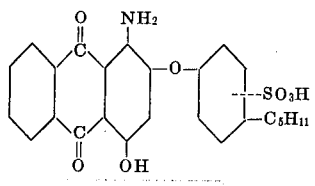
5. The compound
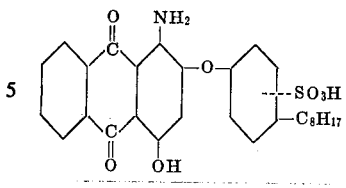
6. The compound
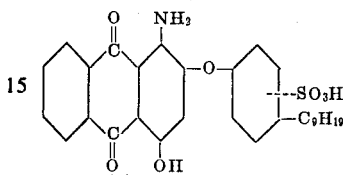
* * * * *

UNITED STATES PATENT OFFICE
CERTIFICATE OF CORRECTION

Patent No. 3,627,792                               Dated  December 14, 1971

Inventor(s)  Robert W. Eltonhead

It is certified that error appears in the above-identified patent and that said Letters Patent are hereby corrected as shown below:

Column 1, immediately following the title, include the following paragraph:
-- This invention relates to a new group of monosulfonated anthraquinone dyes that are capable of imparting washfast bright bluish red or pink shades to natural and synthetic polyamide fibers from substantially neutral dyebaths. --.

Column 2, line 57, "2-hydroxy" should read -- 2-phenoxy 4 --.
Column 3, line 57, "200°-**°F" should read -- 200° - 210°F. --.
In the structural diagram of claim 1 "-SO$_3$H" should read -- -SO$_3$M --.

Signed and sealed this 3rd day of October 1972.

(SEAL)
Attest:

EDWARD M. FLETCHER, JR.  
Attesting Officer

ROBERT GOTTSCHALK  
Commissioner of Patents